United States Patent [19]

Takahara et al.

[11] Patent Number: 5,917,443
[45] Date of Patent: Jun. 29, 1999

[54] VEHICLE-MOUNTED RADAR APPARATUS

[75] Inventors: Toshiyuki Takahara; Masahiro Watanabe, both of Tokyo, Japan

[73] Assignee: Mitsubishi Denki Kabushiki Kaisha, Tokyo, Japan

[21] Appl. No.: 09/000,795

[22] Filed: Dec. 30, 1997

[30] Foreign Application Priority Data

Jul. 15, 1997 [JP] Japan ................................. 9-189517

[51] Int. Cl.$^6$ ............................ G01S 13/93; G01S 13/68
[52] U.S. Cl. ............................ 342/70; 342/147; 342/158
[58] Field of Search ................................. 342/70, 71, 72, 342/56, 147, 158

[56] References Cited

U.S. PATENT DOCUMENTS

| 3,893,114 | 7/1975 | Yamanaka et al. ........................ 342/72 |
| 4,008,473 | 2/1977 | Hinachi et al. ............................. 342/84 |
| 4,143,370 | 3/1979 | Yamanaka et al. ........................ 342/72 |
| 4,552,456 | 11/1985 | Endo ....................................... 342/70 X |
| 4,920,345 | 4/1990 | Lissel et al. ............................... 342/70 |
| 5,266,955 | 11/1993 | Izumi et al. .............................. 342/70 |
| 5,371,718 | 12/1994 | Ikeda et al. ........................... 342/70 X |
| 5,680,097 | 10/1997 | Uemura et al. ....................... 342/70 X |
| 5,710,565 | 1/1998 | Shirai et al. ............................. 342/70 |
| 5,751,211 | 5/1998 | Shirai et al. ......................... 342/70 X |

FOREIGN PATENT DOCUMENTS

| 7209414 | 8/1995 | Japan .............................. G01S 13/60 |
| 8327722 | 12/1996 | Japan . | |

*Primary Examiner*—John B. Sotomayor
*Attorney, Agent, or Firm*—Sughrue, Mion, Zinn, Macpeak & Seas, PLLC

[57] ABSTRACT

An arrangement is provided such that a time counter 5 starts counting an elapsed time after the lapse of a fixed time from the time the output of a beam reference-position detecting means 3 is turned on, such that an angle output value calculated by an angle-calculating means becomes 0 when the direction of a beam emitted from a radar head unit 2 has coincided with a frontal direction of the vehicle.

2 Claims, 4 Drawing Sheets

VEHICLE-MOUNTED RADAR APPARATUS

BACKGROUND OF THE INVENTION

The present invention relates to a vehicle-mounted radar apparatus.

As a conventional vehicle-mounted radar apparatus, an apparatus such as the one shown in FIGS. 5 and 6 is known.

FIG. 5 is a schematic diagram illustrating a conventional vehicle-mounted radar apparatus, and FIG. 6 is a plan view thereof. In the drawings, the direction of a radar head unit 12 including a beam-radiating means is rotated in a reciprocating manner with a fixed pattern by a mechanical control unit 11 serving as a scanning means, thereby allowing the beam-radiating direction to change to left and right. A reference-position detecting unit 13 serving as a reference-position detecting means detects the arrival of the direction of the beam at a reference direction (the position indicated by the two-dotted dash line in FIG. 6) by detecting a pawl portion 12a formed integrally with the radar head unit 12, and the position of the reference-position detecting unit 13 is made adjustable. An ECU 14 includes an angle-calculating means for calculating the direction of the beam on the basis of the time counted by a time counter 15 serving as a time-counting means for counting the elapsed time.

As the reference-position detecting unit 13 serving as the reference-position detecting means, it is possible to use a photointerruptor as shown in FIG. 6, and the photointerruptor is capable of detecting the pawl portion 12a by means of an electron beam which is emitted from a light-emitting element 16 toward a light-receiving element 17.

Next, a description will be given of the operation of the conventional apparatus configured as described above. The direction of the radar head unit 12 is continuously changed in a reciprocating manner by the mechanical control unit 11, thereby effecting the so-called scanning. During this scanning process, when the pawl portion 12a formed integrally with the radar head unit 12 has reached the position of the reference-position detecting unit 13, the output of the reference-position detecting unit 13 is turned on, and the time counter 15 is thereby reset.

When a reflected beam from an object to be detected is detected, the ECU 14 converts the counted result, measured by the time counter 15, into an angle by means of the angle-calculating means on the basis of a preset conversion table, and outputs the same as the angle of the object to be detected.

In addition, the ECU 14 causes the beam to be radiated in pulses by effecting on/off control of beam radiation, and outputs the distance to the object to be detected by such as counting the time from the time of beam radiation until the detection of the reflected beam.

With this conventional vehicle-mounted radar apparatus, in order to allow the frontal direction of the vehicle to coincide with the direction in which an angle output value of the apparatus equals 0, the angle output value is conventionally adjusted by moving the position of the reference-position detecting unit 13 during the operation of mounting the apparatus in the vehicle.

Since the conventional vehicle-mounted radar apparatus is configured as described above, there has been a problem in that, in making adjustment such that the angle output value equals 0 when the frontal direction of the vehicle and the direction of the radar head unit coincide with each other, the position of the aforementioned reference-position detecting unit needs to be moved for each apparatus, thereby making the angle adjustment operation troublesome.

SUMMARY OF THE INVENTION

The present invention has been devised to overcome the above-described problem, and its object is to provide a vehicle-mounted radar apparatus which is capable of alleviating the burden imposed on the angle adjustment operation during mounting of the apparatus in the vehicle.

The vehicle-mounted radar apparatus in accordance with the present invention comprises: a radiating means for radiating a beam to outside the vehicle; a scanning means for continuously rotating a direction of the beam of the radiating means in a reciprocating manner; a reference-position detecting means for detecting the arrival of the direction of the beam at a reference position; a time-counting means for counting an elapsed time; and an angle-calculating means for calculating the direction of the beam on the basis of the time counted by the time-counting means, wherein the time-counting means counts the elapsed time after the lapse of a fixed time from the time an output of the reference-position detecting means is turned on, such that an angle output value equals 0 when the direction of the beam has coincided with a frontal direction of the vehicle.

DETAILED DESCRIPTION OF THE PREFERRED EMBODIMENT

Figure 1:
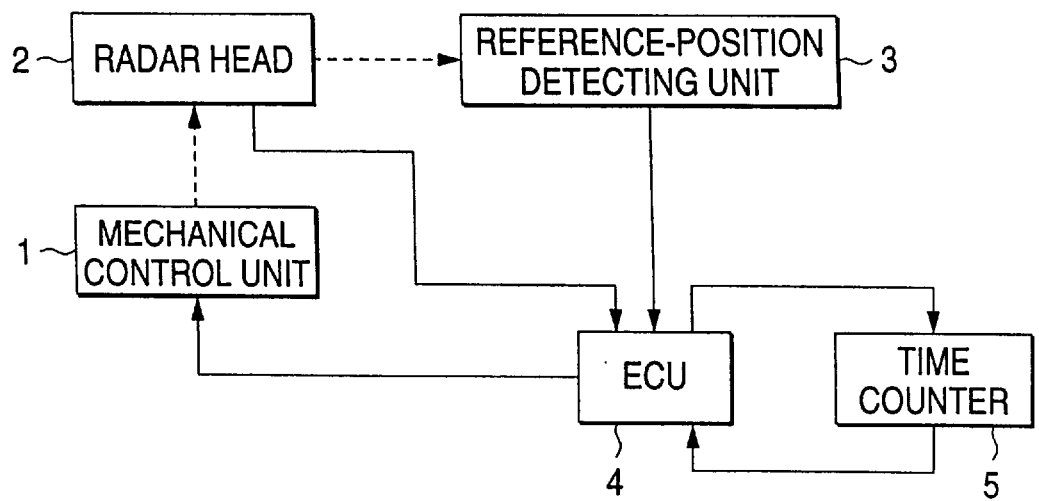
FIG. 1 is a schematic diagram illustrating a vehicle-mounted radar apparatus in accordance with an embodiment of the present invention.
Figure 2:
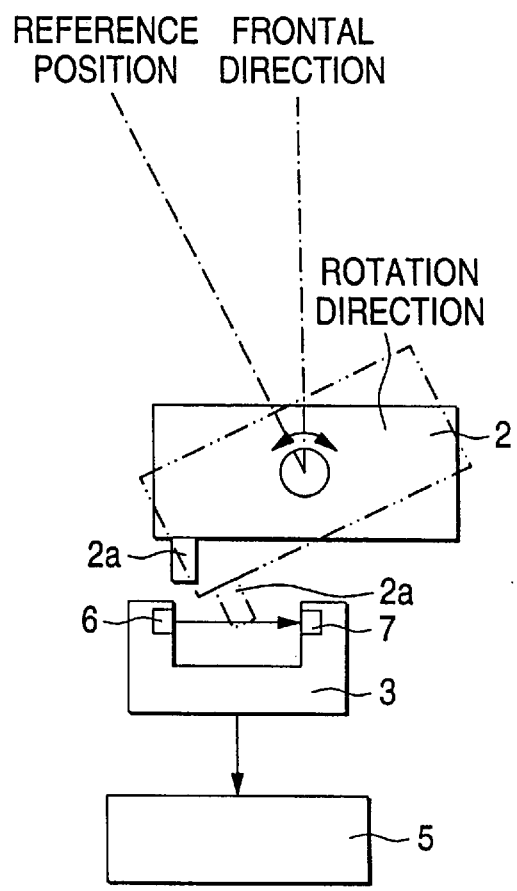
FIG. 2 is a plan view illustrating the vehicle-mounted radar apparatus in accordance with the embodiment of the present invention.

Referring now to the drawings, a description will be given of an embodiment of the present invention. FIG. 1 is a schematic diagram illustrating a vehicle-mounted radar apparatus in accordance with an embodiment of the present invention, and FIG. 2 is a plan view thereof. In the drawings, the direction of a radar head unit 2 including a beam-radiating means is rotated in a reciprocating manner with a fixed pattern by a mechanical control unit 1 serving as a scanning means, thereby allowing the beam-radiating direction to change to leftward and rightward directions. A reference-position detecting unit 3 serving as a reference-position detecting means detects the arrival of the direction of the beam at a reference direction (the position indicated by the two-dotted dash line in FIG. 2) by detecting a pawl portion 2a formed integrally with the radar head unit 2. An ECU 4 includes an angle-calculating means for calculating the direction of the beam on the basis of the time counted by a time counter 5 serving as a time-counting means for counting the elapsed time. As the reference-position detecting unit 3 serving as the reference-position detecting means, it is possible to use a photointerruptor as shown in FIG. 2, and the photointerruptor is capable of detecting the pawl portion 2a by means of such as infrared rays which are emitted from a light-emitting element 6 toward a light-receiving element 7.

Next, a description will be given of the operation. The direction of the radar head unit 2 is continuously changed in a reciprocating manner by the mechanical control unit 1, thereby effecting the so-called scanning. During this scanning process, when the pawl portion 2a formed integrally with the radar head unit 2 has reached the position of the reference-position detecting unit 3, the output of the reference-position detecting unit 3 is turned on.

When a reflected beam from an object to be detected is detected, the ECU 4 converts the counted result, measured by the time counter 15, into an angle by means of the angle-calculating means on the basis of a preset conversion table, and outputs the same as the angle of the object to be detected. In addition, the ECT 14 causes the beam to be radiated in pulses by effecting on/off control of beam radiation, and outputs the distance to the object to be detected by such as counting the time from the time of beam radiation until the detection of the reflected beam.

In the present invention, the angle which is calculated by the angle-calculating means is adjusted by changing the time duration from the time the direction of the beam emitted from the radar head unit 2 reached the reference direction until the time counter 5 starts counting, thereby providing adjustment such that the angle output value equals 0 when the radar head 2 is oriented in the frontal direction of the vehicle.

Namely, the angle adjustment operation for causing the frontal direction of the vehicle and the direction in which the angle output value of the apparatus equals 0 to coincide with each other is effected by processing which is described below, after the vehicle-mounted radar apparatus is mounted at an appropriate position of the vehicle and in a state in which an object to be detected is installed in the frontal direction of the vehicle shown in FIG. 2, for example.

Figure 3:
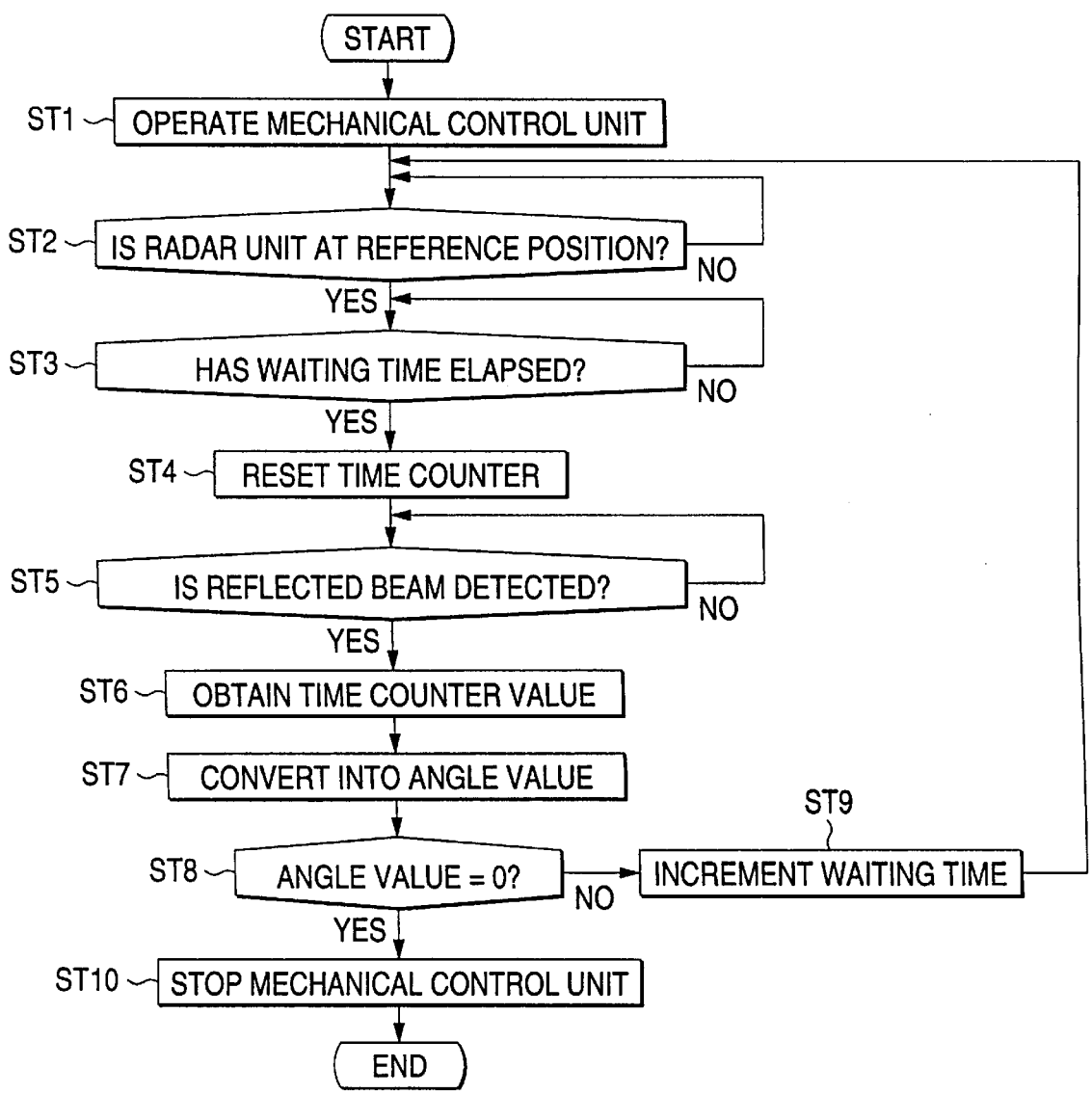
FIG. 3 is a flowchart illustrating angle adjustment processing in accordance with the present invention.

FIG. 3 shows a flowchart of angle adjustment processing by the vehicle-mounted radar apparatus in accordance with the present invention.

In Step ST1 in the drawing, the mechanical control unit 1 is operated to start scanning by the radar head unit 2.

Next, in Step ST2, if the output of the reference-position detecting unit 3 is on, the operation proceeds to an ensuing Step ST4, and if not on, the determination is repeated until the output becomes on.

In Step ST3, the operation waits until a predetermined waiting time Tw elapses after the operation in this step started. The initial value of the waiting time Tw is set to 0.

In Step ST4, the value of the time counter 5 is reset after the lapse of the waiting time Tw.

In an ensuing Step ST5, if a reflected beam from the object to be detected installed in the frontal direction is detected by the radar head unit 2, the operation proceeds to an ensuing Step ST6, and if not detected, the determination is repeated until it is detected.

In Step ST6, the value of the time counter 5 is obtained.

In an ensuing Step ST7, the value obtained in Step ST6 is converted to an angle value by the conversion table.

In Step ST8, a determination is made as to whether or not the angle converted in Step ST7 is 0, and if not 0, the waiting time Tw is incremented in Step ST9 and the operation returns to Step ST2. Then the foregoing operation is repeated any number of times until the angle becomes 0.

If the angle becomes 0, the operation of the mechanical control unit 1 is stopped in Step ST10, and this processing ends.

Figure 4:
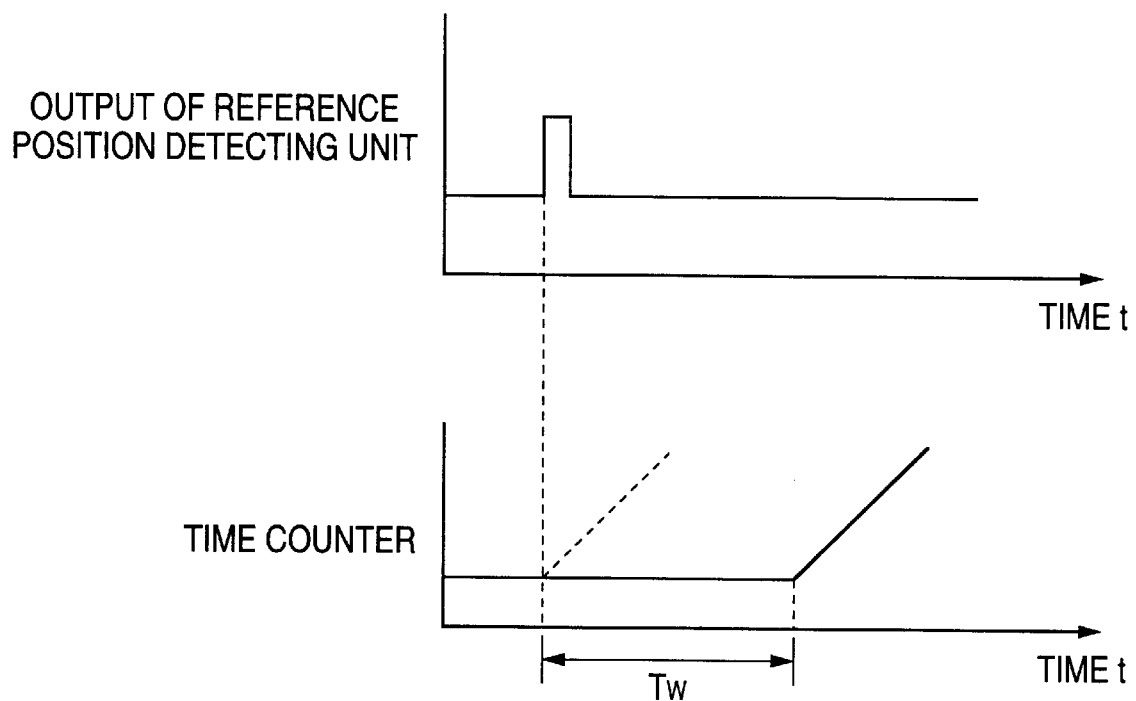
FIG. 4 is a graph illustrating a time-counting operation in the vehicle-mounted radar apparatus in accordance with the embodiment of the present invention.
Figure 5:
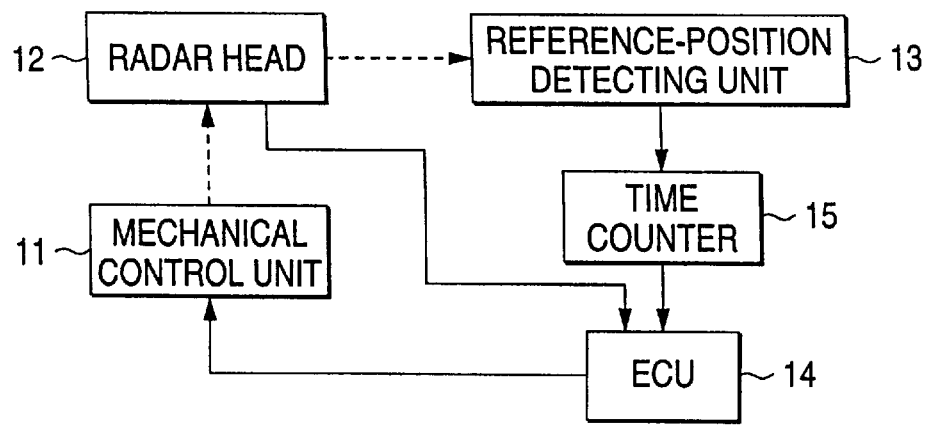
FIG. 5 is a schematic diagram illustrating a conventional vehicle-mounted radar apparatus.
Figure 6:
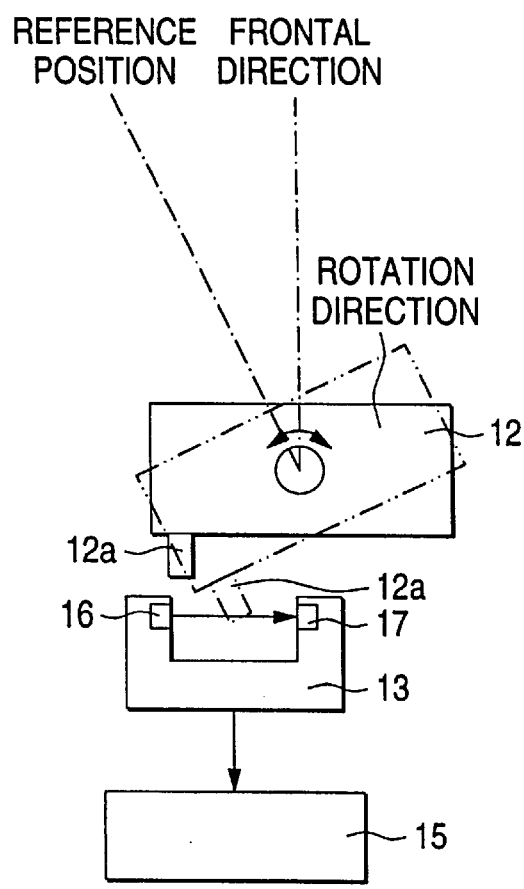
FIG. 6 is a plan view illustrating the conventional vehicle-mounted radar apparatus.

In the present invention, as shown in FIG. 4, even if the reference-position detecting unit 3 detects the pawl portion 2a, the time counter 5 is not immediately set in a reset state, and is set in the reset state after the lapse of the waiting time Tw, whereupon the time counter 5 starts counting.

As described above, the angle which is calculated is adjusted by changing the time duration from the time the direction of the beam emitted reached the reference direction until counting is started, thereby providing adjustment such that the angle output value equals 0 when the radar head 2 is oriented in the frontal direction of the vehicle. Therefore, it is unnecessary to move the position of the reference-position detecting unit 3 for each apparatus, so that it is possible to alleviate the burden imposed on the angle adjustment operation during mounting of the apparatus in the vehicle.

The vehicle-mounted radar apparatus in accordance with the present invention comprises: a radiating means for radiating a beam to outside the vehicle; a scanning means for continuously rotating a direction of the beam of the radiating means in a reciprocating manner; a reference-position detecting means for detecting the arrival of the direction of the beam at a reference position; a time-counting means for counting an elapsed time; and an angle-calculating means for calculating the direction of the beam on the basis of the time counted by the time-counting means. Further, the time-counting means counts the elapsed time after the lapse of a fixed time from the time an output of the reference-position detecting means is turned on, such that an angle output value equals 0 when the direction of the beam has coincided with a frontal direction of the vehicle. Therefore, it is unnecessary to move the position of the reference-position detecting unit 3 for each apparatus, with the result that it is possible to alleviate the burden imposed on the angle adjustment operation during mounting of the apparatus in the vehicle.

What is claimed is:

1. A vehicle-mounted radar apparatus mounted in a vehicle, comprising:

a radiating means for radiating a beam to outside the vehicle;

a scanning means for continuously rotating a direction of the beam of said radiating means in a reciprocating manner;

a reference-position detecting means for detecting the arrival of the direction of the beam at a reference position;

a time-counting means for counting an elapsed time; and an angle-calculating means for calculating the direction of the beam on the basis of the time counted by said time-counting means, wherein said time-counting means starts to count the elapsed time after lapse of a fixed time from the time an output of said reference-position detecting means is turned on, such that an angle output value equals 0 when the direction of the beam has coincided with a frontal direction of the vehicle.

2. A vehicle-mounted radar apparatus as claimed in claim 1, wherein said fixed time is determined by the steps of:

detecting said direction of the beam of said radiating means being at the reference position by said reference-position detecting means;

waiting a waiting time;

resetting said time counting means after lapse of the waiting time;

restarting count of the time counting means;

detecting a reflected beam from an object to be detected installed in the frontal direction;

obtaining counter value of the time counting means;

converting the counter value into an angle value by said angle-calculating means;

determining whether or not the angle converted is 0, if not 0, the waiting time is incremented and the above operations repeated, whereas if the angle becomes 0, the operation is stopped and the waiting time is stored as said fixed time.

* * * * *